US012718336B2

(12) United States Patent
Shen et al.

(10) Patent No.: US 12,718,336 B2
(45) Date of Patent: Aug. 25, 2026

(54) CASCADE IMAGE PROCESSING FOR NOISE REDUCTION

(71) Applicant: QUALCOMM Incorporated, San Diego, CA (US)

(72) Inventors: Quanmin Shen, Shenzhen (CN); Zhongshan Wang, Shenzhen (CN); Wen-Chun Feng, New Taipei City (TW); Chi Zhang, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/560,044

(22) PCT Filed: Jul. 7, 2021

(86) PCT No.: PCT/CN2021/104883
§ 371 (c)(1),
(2) Date: Nov. 9, 2023

(87) PCT Pub. No.: WO2023/279270
PCT Pub. Date: Jan. 12, 2023

(65) Prior Publication Data

US 2024/0354910 A1 Oct. 24, 2024

(51) Int. Cl.
*G06T 5/70* (2024.01)
*G06T 5/50* (2006.01)
(Continued)

(52) U.S. Cl.
CPC .................. *G06T 5/70* (2024.01); *G06T 5/50* (2013.01); *G06T 5/92* (2024.01); *H04N 23/81* (2023.01);
(Continued)

(58) Field of Classification Search
None
See application file for complete search history.

(56) References Cited

U.S. PATENT DOCUMENTS

2008/0239094 A1* 10/2008 Baqai .................. H04N 23/843 348/207.99
2015/0296193 A1 10/2015 Cote et al.
(Continued)

FOREIGN PATENT DOCUMENTS

CN 105894478 A 8/2016
CN 106504207 A 3/2017
(Continued)

OTHER PUBLICATIONS

"A Novel Approach for Denoising and Enhancement of Extremely Low-light Video"; Kim et al; IEEE Transactions on Consumer Electronics; vol. 61, No. 1; Feb. 2015. (Year: 2015).*
(Continued)

*Primary Examiner* — David Ometz
(74) *Attorney, Agent, or Firm* — QUALCOMM Incorporated

(57) ABSTRACT

This disclosure provides systems, methods, and devices for image processing that support noise reduction in low-light video sequences. The noise reduction is accomplished through a cascaded set of operations that are configured based on each set of operations location within the cascaded pipeline. The cascade may be implemented as a series of cascaded image post-processing engines (IPEs) within an image signal processor (ISP).

24 Claims, 4 Drawing Sheets

(51) Int. Cl.
*G06T 5/92* (2024.01)
*H04N 23/81* (2023.01)

(52) U.S. Cl.
CPC ............... *G06T 2207/10016* (2013.01); *G06T 2207/30168* (2013.01)

(56) References Cited

U.S. PATENT DOCUMENTS

2018/0315172 A1* 11/2018 Smirnov .................. G06T 5/70
2021/0073956 A1 3/2021 Guerin et al.

FOREIGN PATENT DOCUMENTS

CN 112261391 A 1/2021
WO WO-2020126023 A1 * 6/2020 ............. H04N 23/88

OTHER PUBLICATIONS

"Image Enhancement for Extremely Low Light Conditions"; Park et al; 11th IEEE International Conference on Advanced Video and Signal Based Surveillance (AVSS); pp. 307-312. (Year: 2014).*
"Perceptual Enhancement of Low Light Images based on Two-step Noise Suppression"; Su et al; IEEE Access; vol. 6; pp. 7005-7018; Jan. 2018. (Year: 2018).*
Supplementary European Search Report—EP21948768—Search Authority—The Hague—Jan. 30, 2025 (2106463EP).
International Search Report and Written Opinion—PCT/CN2021/104883—ISA/EPO—Mar. 28, 2022 (2106463WO1).

* cited by examiner

CASCADE IMAGE PROCESSING FOR NOISE REDUCTION

CROSS-REFERENCE TO RELATED APPLICATIONS

This application claims the benefit of International Patent Application No. PCT/CN2021/104883, entitled, "CASCADE IMAGE PROCESSING FOR NOISE REDUCTION," filed on Jul. 7, 2021, which is expressly incorporated by reference herein in its entirety.

TECHNICAL FIELD

Aspects of the present disclosure relate generally to image processing, and more particularly, to noise reduction in images. Some features may enable and provide improved image quality, including supporting real-time high-resolution video sequences in low-light environments.

INTRODUCTION

Image capture devices have inherent limitations. Image quality is related to a sensitivity of an image sensor capturing an image and the brightness of the scene being captured. Limits both on the image sensor capability and the light available can limit the capturing of high-quality images.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The image signal processor may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor.

In an example, the image signal processor may receive an instruction to capture a sequence of image frames in response to the loading of software, such as a camera application, on the CPU. The image signal processor may be configured to produce a single flow of output frames, based on respective corrected images from the image sensors. The single flow of output frames may include image frames that contain image data from an image sensor that have been corrected, such as by processing through an image post-processing engine (IPE), a cascaded series of IPEs, and/or other image processing circuitry for performing one or more of noise reduction, gamma correction, and tone mapping. The corrected image frame may be produced by combining aspects of the image correction of this disclosure with other computational photography techniques such as high dynamic range (HDR) photography or multi-frame noise reduction (MFNR).

After an output frame representing the scene is determined by the image signal processor using the image correction described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3 A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have improved appearance in low-light photography.

In some aspects, the method may be performed for HDR photography in which the first image frame and the second image frame are captured using different exposure times, different apertures, different lenses, or other different characteristics that may result in improved dynamic range of a fused image when the two image frames are combined. In some aspects, the method may be performed for MFNR photography in which the first image frame and the second image frame are captured using the same or different exposure times.

In some aspects, a device may include an image signal processor or a processor including specific functionality for camera controls and/or processing, such as enabling or disabling the image correction or otherwise controlling aspects of the image correction, such as by specifying a tone mapping, amount of gamma correction, or matrix for color correction. The at least one processor may also or alternatively include an application processor. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
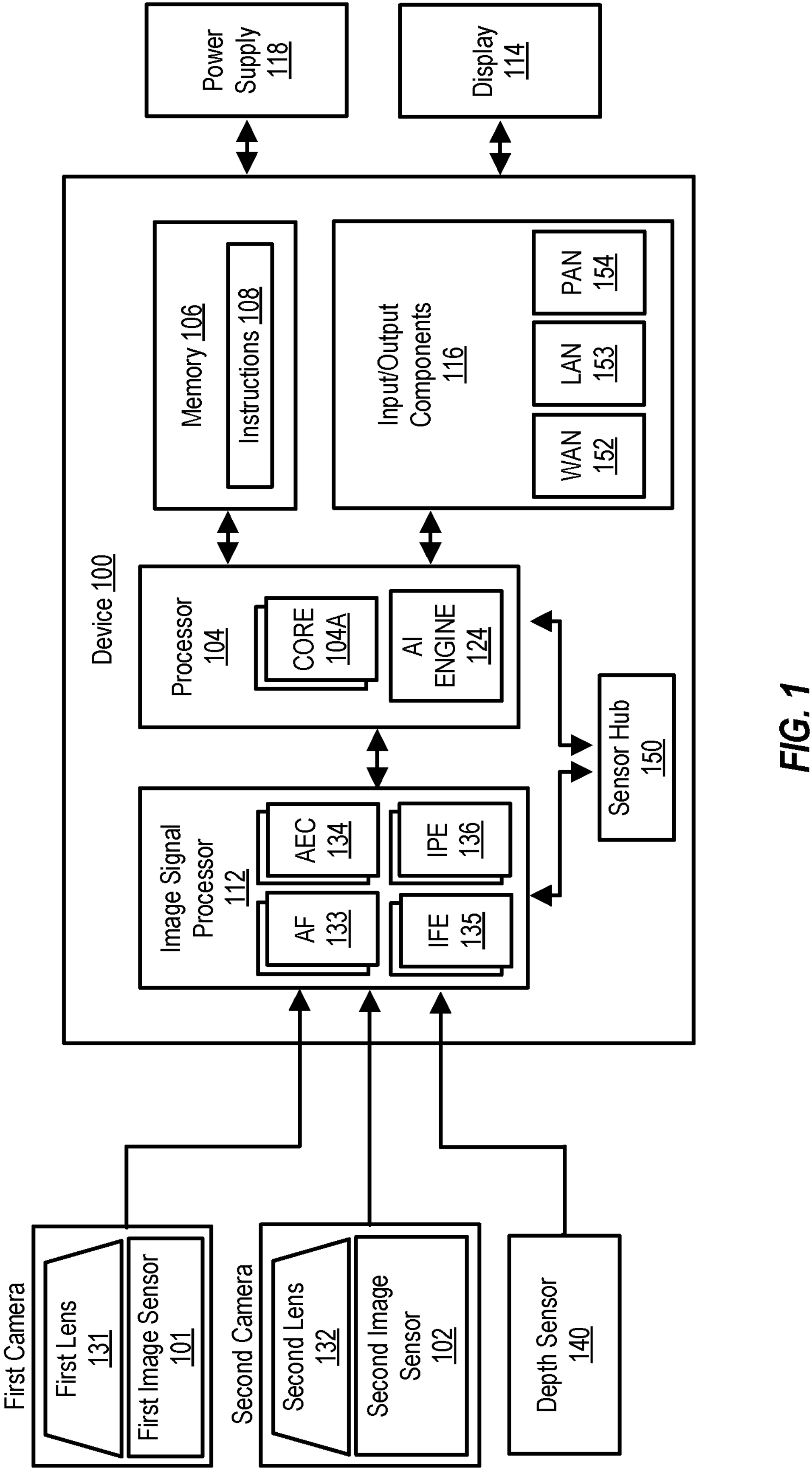
FIG. 1 shows a block diagram of an example device 100 for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support high-quality, high-resolution (e.g., 4K, 8K, 16K, or above), video capture using real-time processing to reduce noise, increase brightness, and improve detail and texture within the video. Aspects of the disclosure may be particularly advantageous with image capture devices having small pixel sizes, which have reduced light gathering ability and are more likely to suffer in low-light environments.

Particular implementations of the subject matter described in this disclosure may be implemented to realize one or more of the following potential advantages or benefits. In some aspects, the present disclosure provides techniques for reducing noise, increasing brightness, enhancing image quality, improving detail an texture, and providing real-time processing of high-resolution video sequences.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, AFE 135, APE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
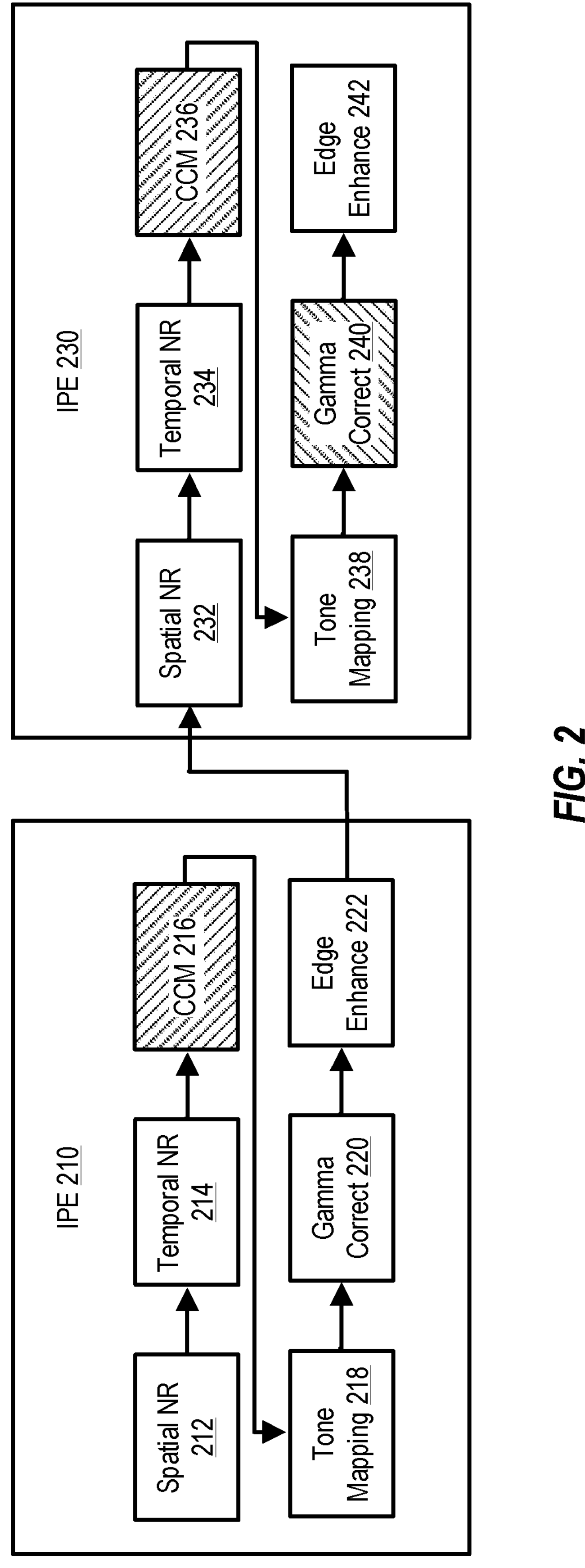
FIG. 2 is a block diagram illustrated cascaded image post-processing engines (IPEs) according to one or more aspects.

In some aspects, the ISP 112 may configure one or more of the IPEs 136 is a cascaded or series configuration, such that the input of at least one of the IPEs is the output of another IPE. One example of a cascaded IPE configuration for an ISP is shown in FIG. 2. FIG. 2 is a block diagram illustrated cascaded image post-processing engines (IPEs) according to one or more aspects. A cascaded IPE 200 includes a first IPE 210 and a second IPE 230. The output of the first IPE 210 is input to the second IPE 230. The output of the second IPE 230 may be applied as an input to additional IPEs when the cascaded series of IPEs is longer than two IPEs. A final IPE in the cascade of IPEs may output a corrected first image frame. That corrected first image frame may be used in a preview video display of, for example, a camera application or for recording a video sequence to memory.

Each of the IPEs 210 and 230 may be generic IPEs. That is, each of the IPEs 210 and 230 may include circuitry for spatial noise reduction (NR) 212, 232, circuitry for temporal NR 214, 234, color correction matrix (CCM) processing 216, 236, circuitry for tone mapping 218, 238, circuitry for gamma correction 220, 240, and circuitry for edge enhancement 222, 242. Although each of the IPEs 210 and 230 are generic processing units, each of the IPEs 210 and 230 may be configured to perform operations specific to the IPE's location in a cascaded series of IPEs. For example, IPE 210 may be configured to perform gamma correction 220 when IPE 210 is a first stage of cascaded IPEs and IPE 230 may be configured to disable gamma correction 240 when IPE 230 is a second or later stage of cascaded IPEs. As another example, only one IPE of cascaded IPEs may be configured with enabled color correction matrix (CCM) processing. As a further example, although each of IPEs 210 and 230 include circuitry for tone mapping 218, 238, each may be configured with a different mapping. For example, IPE 210's circuitry for tone mapping 218 may apply a first tone mapping for changing the tone of an entire image frame and IPE 230's circuitry for tone mapping 238 may apply a second tone mapping for contrast enhancement and/or luminance enhancement.

The cascaded IPEs may be used to perform noise reduction and boost brightness. The cascading of two or more IPEs to boost brightness may not suffer from noise added by brightness boosting by implementing multiple noise reductions. The cascaded noise reduction of the cascaded IPEs may generate corrected image frames with less noise, vivid colors, brighter frame, and/or contrast-enhanced edges. The boosting of brightness is useful in low-light photography to enhance image detail without significantly increasing noise common in low-light photography or while reducing the noise common in low-light photography. Processing of image frames through the cascaded IPEs may be advantageously applied to image frames captured from a small optical format (e.g., small pixel) sensor, because the small format sensors may have reduced low-light photography resulting from the small format sensors capturing less light for a given exposure time than larger format sensors.

Example results from a test scene captured by an image sensor and processed with one IPE and two cascaded IPEs are shown in Table 1, which demonstrates increased texture, reduced noise, and increased luma values when a cascade of two IPEs is used to process an image frame that are all improvements over the values obtained when a single IPE is used to process the image frame.

| | Texture | Noise | Luma |
|---|---|---|---|
| Cascade off | 30.76 | 7.04 | 85 |
| Cascade on | 45.35 | 6.13 | 118 |

Figure 3:
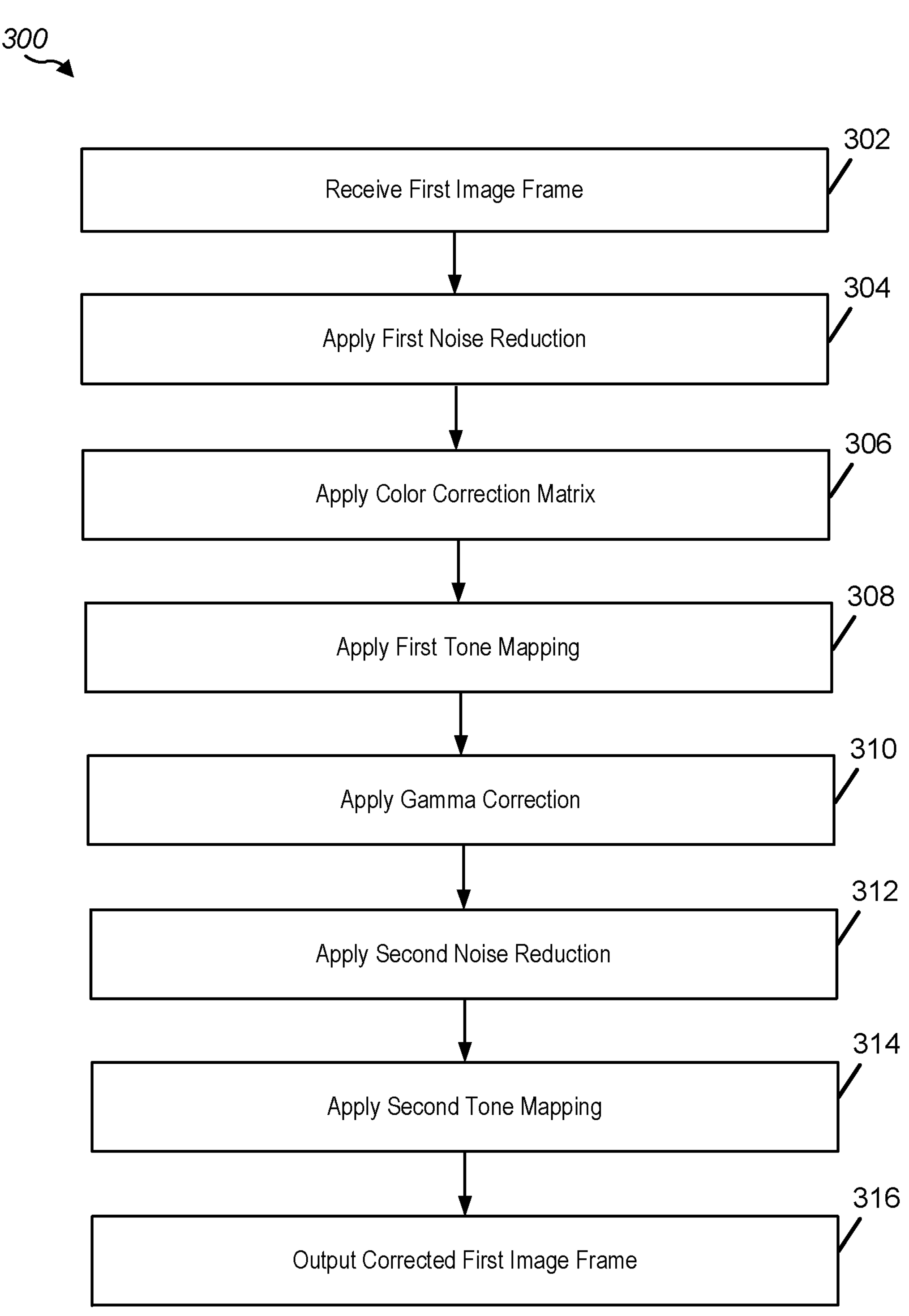
FIG. 3 is a flow chart illustrating a method for processing an image frame with multiple noise reduction operations according to one or more aspects.

A method of processing an image frame with two or more noise reductions and tone mappings to improve appearance of the image frame is shown in the flow chart of FIG. 3. FIG. 3 is a flow chart illustrating a method for processing an image frame with multiple noise reduction operations according to one or more aspects. In some embodiments, the method of FIG. 3 may be implemented in multiple hardware IPE blocks, such as shown in FIG. 2. However, the method of FIG. 3 may also be implemented using a single hardware IPE block, other application-specific circuitry, and/or on a generic processor. The method 300 begins at block 302 with receiving a first image frame. The first image frame may be captured by a first image sensor and processed through an image front end (IFE) before receiving the first image frame at block 302. In some embodiments, the first image frame may be a combined output of multiple image frames captured from one or more image sensors, such as when the first image frame is a high dynamic range (HDR) image frame generated from multiple exposures of one or more image sensors.

A first sequence of image processing operations includes blocks 304, 306, 308, and 310. At block 304, a first noise reduction is performed on the first image frame. The first noise reduction may include spatial and/or temporal noise reduction. At block 306, a color correction matrix (CCM) is applied, such as to generate more vivid colors in the image frame. At block 308, a first tone mapping is applied. Tone mapping may be used to map one set of colors to another set of colors to generate a particular artistic effect in the image. In some embodiments, the first tone mapping of block 308 may be applied to the first image frame to approximate the appearance of high-dynamic-range images in a medium that has a more limited dynamic range. At block 310, a gamma correction is applied to boost lighting in the first image frame. Each of the processing of blocks 304, 306, 308, and 310 may access and modify the values in memory corresponding to the first image frame. Thus, the input of one of the processing blocks 304, 306, 308, and 310 is the output of another of the processing blocks 304, 306, 308, and 310. The processing performed before a second noise reduction at block 312 may be performed in a different order than shown in FIG. 3, such as by applying tone mapping of block 308 after the gamma correction of block 310. In some embodiments, the first sequence of operations in blocks 304, 306, 308, and 310 may be performed by a first hardware circuit, such as a first IPE.

A second sequence of image processing operations includes blocks 312, 314, and 316. At block 312, a second noise reduction is performed on the first image frame as modified by the first sequence of processing operations of blocks 304, 306, 308, and 310. At block 314, a second tone mapping is applied. The second tone mapping may be a different tone mapping than that of block 308. For example, different maps may be used when modifying the image frame input to blocks 308 and 314. The second tone mapping may be configured to provide contrast enhancement and luminance enhancement, rather than generic, artistic color mapping as in the first tone mapping of block 308. At block 316, the first image frame as modified by the first sequence of image processing operations of blocks 304, 306, 308, and 310 and further modified by the second sequence of image processing operations of blocks 312, 314, and 316 is output as a corrected first image frame. The corrected first image frame may be used, for example, along with other image frames that may or may not be similarly processed to generate a video sequence may be displayed to the user of the image capture device as a preview stream in a camera application.

Figure 4:
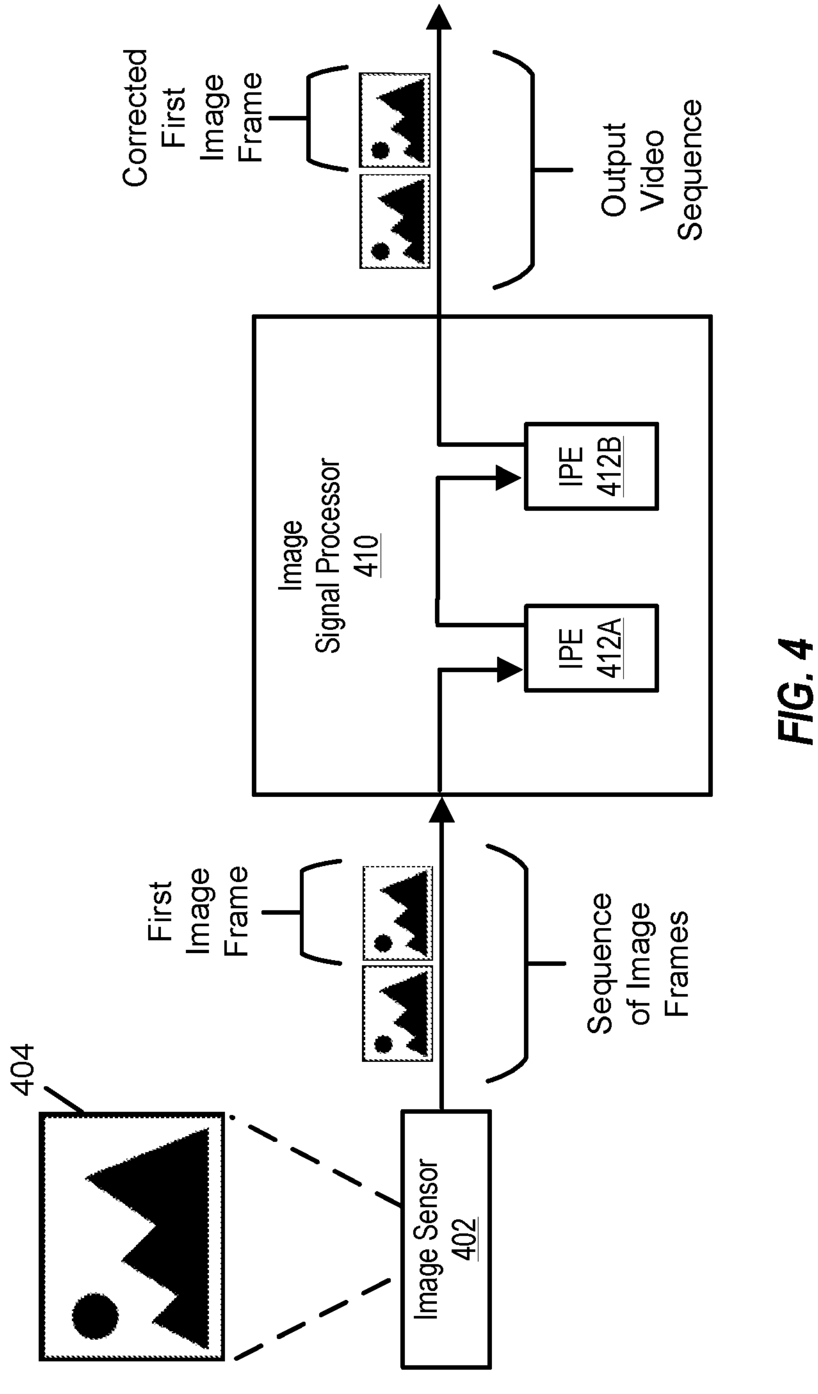
FIG. 4 is a block diagram illustrating a processing flow for an image frame through cascaded image post-processing engines (IPEs) according to one or more aspects.

One example of a processing flow for image frames as part of a video sequence in an image capture device is shown in FIG. 4. FIG. 4 is a block diagram illustrating a processing flow for an image frame through cascaded image post-processing engines (IPEs) according to one or more aspects. An image sensor 402 generates a sequence of image frames including a first image frame representing a scene 404. The image signal processor 410 receives the sequence of image frames and may perform real-time processing on the image frames such that an output video sequence may be generated and displayed to a user to monitor the scene 404 in real-time, such that changes in the scene may be perceived by the user at approximately the time the changes occur (e.g., within less than 500 milliseconds, less than 400 milliseconds, less than 300 milliseconds, less than 200 milliseconds, or less than 100 milliseconds). The ISP 410 may have a plurality of IPEs, such as IPE 412A and 412B for flexibly processing image frames received by the ISP 410. For example, the ISP 410 may use different IPEs in parallel for processing image frames received in parallel from different image sensors. In another example, the ISP 410 may use different IPEs in series for processing an image frame received from a single image sensor.

The ISP 410 may determine a camera configuration, such as by receiving a configuration from a camera application executing on an image capture device, and appropriate assign available IPEs to certain processing within the ISP 410. In one example, the camera application may specify whether to apply a cascaded IPE configuration based on a user setting to activate a "low-light" or "night vision" mode or by applying one or more rules to the image frame to determine whether to activate cascaded IPEs. When a low-light condition, or other condition is present to trigger cascaded IPEs, the first image frame received form the sensor may be processed to generate an intermediate first image frame in response to the determination of the low-light or other condition to activate cascaded IPEs. Alternatively or additionally, the ISP may determine when to activate a cascaded IPE configuration based on the same or different conditions. The conditions for application or ISP determination of the cascaded IPE configuration may be a combination of one or more factors including exposure gain, exposure time, lux index, and video frames per second (FPS). For example, cascaded IPEs may be configured when the exposure gain, exposure time, and lux index are each above a certain threshold or their combined values exceeds a certain threshold. Smaller video FPS provide for a longer exposure time for images frames of the video sequence. Thus, the video FPS may be used to adjust the threshold values used to trigger the cascaded IPE or factored into the value compared to the threshold. The IPE configuration (e.g., single IPE or cascaded IPE) determination may be performed prior to receiving the first image frame for processing (e.g., as a configuration in the camera application and/or a configuration based on a previous image frame processed by the ISP), after receiving the first image frame (e.g., by determining statistics from the first image frame), and/or on an intermediate first image frame (e.g., by determining statistics from the first image frame after processing through a first IPE). When a single IPE configuration is determined, other noise reduction processing may be applied, such as multi-frame noise reduction by fusing the output of the single IPE with another image frame.

In some embodiments the ISP 410 may configure one or more IPEs to perform cascaded operations similar to those described with reference to FIG. 2 and FIG. 3. For example, the ISP 410 may cascade two separate IPEs 412A and 412B to perform operations related to a first noise reduction operation and a second noise reduction operation, respectively. For example, IPE 412A may be configured similar to IPE 210 of FIG. 2, and IPE 412B may be configured similar to IPE 230 of FIG. 2. The IPE 412A may perform operations related to blocks 304, 306, 308, 310, and 312 of FIG. 3, and the IPE 412B may perform operations related to blocks 310, 312, and 314. The IPEs 412A and 412B may be coupled in series such that the output of IPE 412A is input to IPE 412B, and the output of IPE 412B is the output video sequence including at least a corrected first image frame. The processing in the IPE 412B may be determined by 3 A metadata (including one or more of exposure gain, exposure time, lux index, white balance WB gain, corrected color temperature CCT). In some embodiments, the ISP 410 may cascade IPEs using a single IPE by using a loopback from the output of an IPE back to that IPE's input and reconfiguring the IPE to perform the second set of noise reduction operations.

In one or more aspects, techniques for supporting image correction using cascaded IPEs may include additional aspects, such as any single aspect or any combination of aspects described below or in connection with one or more other processes or devices described elsewhere herein. In some implementations, the apparatus includes a wireless device, such as a UE. In some implementations, the apparatus may include at least one processor, and a memory coupled to the processor. The processor may be configured to perform operations described herein. In some other implementations, the apparatus may include a non-transitory computer-readable medium having program code recorded thereon and the program code may be executable by a processor for causing the apparatus to perform operations described herein with reference to the apparatus. In some implementations, the apparatus may include one or more means configured to perform operations described herein. In some implementations, a method of wireless communication may include one or more operations described herein for processing image frames using cascaded IPEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
receiving a first image frame;
processing the first image frame through a first pass in an image correction algorithm having a first configuration to generate an intermediate first image frame, wherein the first configuration results in the processing including a first set of operations related to a first noise reduction operation; and
processing the intermediate first image frame through a second pass in the image correction algorithm having a second configuration to generate a corrected first image frame, wherein the second configuration results in the processing including a second set of operations related to a second noise reduction operation, and wherein the second configuration includes applying a color correction matrix to the intermediate first image frame after applying the second noise reduction operation and before applying a second tone mapping to generate the corrected first image frame.

2. The method of claim 1, further comprising forming a video sequence comprising the corrected first image frame and at least a corrected second image frame.

3. The method of claim 2, further comprising at least one of:
storing the video sequence in a memory;
transmitting the video sequence through a wireless network; or
displaying the video sequence on a display.

4. The method of claim 1, wherein:
processing the first image frame through the first pass in the image correction algorithm comprises processing the first image frame through a first image post-processing engine (IPE); and
processing the intermediate first image frame through the second pass in the image correction algorithm comprises processing the first image frame through a second image post-processing engine (IPE).

5. The method of claim 4, wherein the first IPE is the same IPE as the second IPE.

6. The method of claim 1, wherein:
the first configuration for the image correction algorithm comprises applying a first tone mapping; and
the second configuration for the image correction algorithm comprises applying the second tone mapping for contrast enhancement and luminance enhancement, the second tone mapping being different than the first tone mapping.

7. The method of claim 1, wherein:
the first configuration for the image correction algorithm comprises applying gamma correction; and
the second configuration for the image correction algorithm does not comprise applying gamma correction.

8. The method of claim 1, wherein:
only the second configuration of the image correction algorithm comprises applying the color correction matrix.

9. The method of claim 1, further comprising:
determining a low-light condition is present in the first image frame; and
processing the first image frame and processing the intermediate first image frame in response to the determination of the low-light condition.

10. The method of claim 1, further comprising:
determining a low-light condition is not present in the first image frame;
receiving a second image frame in response to determining the low-light condition is not present; and
processing the intermediate first image frame and the second image frame to determine the corrected first image frame having reduced noise using a multi-frame noise reduction (MFNR) algorithm.

11. A method, comprising:
receiving a first image frame;
applying a first noise reduction to the first image frame;
applying a first tone mapping to the first image frame after applying the first noise reduction;
applying a gamma correction to the first image frame after applying the first tone mapping;
applying a second noise reduction to the first image frame after applying the gamma correction;
applying a color correction matrix to the first image frame after applying the second noise reduction;
applying a second tone mapping to the first image frame after applying the color correction matrix; and
outputting a corrected first image frame after applying the first noise reduction, applying the first tone mapping, applying the gamma correction, applying the second noise reduction, applying the second tone mapping, and applying the color correction matrix.

12. The method of claim 11, wherein:
a first image post-processing engine (IPE) performs the steps of applying the first noise reduction, applying the first tone mapping, and applying the gamma correction; and
a second image post-processing engine (IPE) performs the steps of applying the second noise reduction, and applying the second tone mapping.

13. The method of claim 11, further comprising:
determining a low-light condition is present in the first image frame; and
in response to determining the low-light condition is present, performing the steps of applying the first noise reduction, applying the first tone mapping, applying the gamma correction, applying the second noise reduction, and applying the second tone mapping.

14. The method of claim 11, further comprising:
forming a video sequence comprising the corrected first image frame and at least a corrected second image frame; and
at least one of:
storing the video sequence in a memory;
transmitting the video sequence through a wireless network; or
displaying the video sequence on a display.

15. An apparatus, comprising:
an image signal processor comprising a plurality of image post-processing engines (IPEs) including at least a first IPE and a second IPE,
wherein the image signal processor is configured to:
receive a first image frame;
process the first image frame using the first IPE to generate an intermediate first image frame; and process the intermediate first image frame using the second IPE to generate a corrected first image frame, wherein to process the intermediate first image frame using the second IPE includes to apply a color correction matrix to the intermediate first image frame after a second noise reduction and before a second tone mapping to generate the corrected first image frame.

16. The apparatus of claim 15:

wherein the image signal processor is configured to configure the first IPE to perform steps comprising:

applying a first noise reduction;

applying a first tone mapping; and applying a gamma correction; and wherein the image signal processor is configured to configure the second IPE to perform steps comprising:

applying the second noise reduction; and applying the second tone mapping.

17. The apparatus of claim 15, wherein the image signal processor is configured to configure the second IPE to apply the color correction matrix.

18. The apparatus of claim 15, wherein the image signal processor is configured to configure the second IPE to not apply a gamma correction.

19. The apparatus of claim 15, wherein the image signal processor is configured to assign the plurality of IPEs for processing image frames from one or more image sensors.

20. An apparatus, comprising:

a memory; and at least one processor configured to perform operations of:

receiving a first image frame;

processing the first image frame through a first pass in an image correction algorithm having a first configuration to generate an intermediate first image frame, wherein the first configuration results in the processing including a first set of operations related to a first noise reduction operation; and processing the intermediate first image frame through a second pass in the image correction algorithm having a second configuration to generate a corrected first image frame, wherein the second configuration results in the processing including a second set of operations related to a second noise reduction operation, and wherein the second configuration includes applying a color correction matrix to the intermediate first image frame after the second noise reduction operation and before a second tone mapping to generate the corrected first image frame.

21. The apparatus of claim 20, wherein the at least one processor comprises an image signal processor.

22. The apparatus of claim 20, wherein the at least one processor comprises a graphics processing unit (GPU).

23. The apparatus of claim 20, wherein the at least one processor comprises a central processing unit (CPU).

24. The apparatus of claim 20, further comprising an image capture device.

* * * * *